Patented Apr. 17, 1934

1,955,080

UNITED STATES PATENT OFFICE 1,955,080

METHOD OF PREPARING ANHYDROUS ALKALI METAL PHENOXIDES

Lindley E. Mills, Midland, Mich., assignor to The Dow Chemical Company, Midland, Mich., a corporation of Michigan No Drawing. Application May 18, 1932, Serial No. 612,165

9 Claims. (Cl. 260—154)

The invention relates to methods for the preparation of substantially pure anhydrous alkali metal phenoxides.

The phenoxides of the alkali metals possess the property of absorbing water with exceeding readiness and it has been found difficult to obtain the said anhydrous salts in a substantially pure state. The preparation of the hydrated phenoxides of the alkali metals may be accomplished in a ready manner by methods well known in the art, but it is virtually impossible, due to hydrolysis, to obtain a pure anhydrous product by drying the hydrated compounds. For instance, in ordinary methods of preparing sodium phenoxide it is found that about ten per cent of free phenol is liberated by hydrolysis during the drying of the hydrated compound produced by crystallizing from an aqueous medium. In view of this, various methods have been proposed to effect the preparation of the anhydrous phenoxides, for example, by treating molten phenol directly with a pure alkali metal. This reaction necessitates careful drying of the phenol and must be carried out in a closed system in order to avoid water entering the reaction. Another method of this type embraces separately dissolving the phenol and the alkali metal in absolute alcohol, mixing the two solutions and evaporating to dryness, whereby a practically anhydrous phenoxide is obtained. However, certain disadvantages attach to such modes of procedure, particularly in commercial practice, principally because of the high cost incidental to the use of pure metallic alakali metals and/or absolute alcohol.

It is, therefore, among the objects of the invention to provide a method whereby the aforementioned difficulties are avoided and the preparation of the substantially pure anhydrous alkali metal phenoxides may be accomplished in a ready manner.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

My method comprises dissolving a phenol in a suitable solvent wherein the phenoxide formed during the ensuing reaction is substantially insoluble, mixing therewith a solution of an alkali metal hydroxide dissolved in a solvent of lower boiling point than the first said solvent, evaporating off the second said solvent and the water formed during the reaction, and separating the phenoxide crystals from the mother liquor.

The following specific examples are illustrative of my general method for the preparation of the anhydrous phenoxides of the alkali metals.

*Example 1.—Preparation of sodium phenoxide*

Two solutions were prepared by separately dissolving 23.5 grams of $C_6H_5OH$ in 875 milliliters of toluene, and 10 grams of NaOH in 150 milliliters of methyl alcohol. The solutions were then poured together into a flask provided with a fractionating column and having a mechanical agitator therein. The flask was heated on an oil bath to evaporate off alcohol and water formed by the reaction. When the vapor temperature in the still head reached a temperature approaching the boiling point of toluene, e. g. about 109° C., the distillation was stopped. During the distillation crystals of sodium phenoxide separated out from the reaction mixture in the flask. The contents of the flask were then filtered and the crystals dried in vacuuo to remove the traces of solvent. The yield of substantially pure, white, fluffy, sodium phenoxide crystals was 30 grams, which approximated 100 per cent of the yield theoretically obtainable.

*Example 2.—Preparation of potassium phenoxide*

A solution consisting of 23.5 grams of $C_6H_5OH$ in 700 milliliters of toluene was added to a solution of 14 grams of KOH in 100 milliliters of methyl alcohol. The reaction mixture was placed in the fractionating flask and distilled to evaporate off the alcohol and water of reaction. The distillation was stopped when the vapors emanating from the flask reached a temperature of 109° C., the contents of the flask were then filtered to obtain the potassium phenoxide crystals which had separated out during the distillation. The crystals were dried to remove the traces of solvent and then weighed. The yield of substantially pure potassium phenoxide was 30.7 grams or 93 per cent of theoretical.

*Example 3.—Preparation of sodium 2-chloro-6-phenylphenoxide*

51 grams of 2-chloro-6-phenylphenol was dissolved in 700 milliliters of xylene and a solution of 10 grams of NaOH dissolved in 150 milliliters of methyl alcohol incorporated thereinto. The solutions were then placed in a fractionating flask and distilled on a heated oil bath. When the vapor temperature reached 140° C., the distillation was stopped and the contents of the flask was filtered to obtain the phenoxide crystals which had separated out from the reaction mixture during distillation. The yield of crystals was 47 grams or 83 per cent of the theoretical yield.

*Example 4.—Preparation of sodium ortho-cyclohexylphenoxide*

44 grams of 2-cyclohexylphenol was dissolved in 900 milliliters of xylene and 10 grams of NaOH dissolved in 10 milliliters of water was added thereto. The reaction mixture was distilled, with thorough agitation, until the vapor temperature was about 140° C. The still residue was then filtered to separate the phenoxide crystals, which had precipitated during the distillation, from the xylene. The crystals were washed with benzene and dried in vacuuo. The yield was 46 grams or 92 per cent of theoretical. Analysis showed the compound to have a purity above 99 per cent.

The following table shows the results obtained from treating a number of representative phenols substantially in the same manner as that described in the foregoing specific examples. The solvent used for the phenol was toluene, the alkali metal hydroxide was the sodium compound, and the solvent therefor was methyl alcohol.

| Phenol used | Amount of phenol grams | Milliliters of phenol solvent | Grams alkali metal hydroxide | Milliliters of hydroxide solvent | Yield Grams | Yield Per cent |
|---|---|---|---|---|---|---|
| Hydroquinone | 27.5 | 700 | 20 | 300 | 38.2 | 99.5 |
| 2-Phenylphenol | 85 | 1,200 | 20 | 300 | 92.2 | 96 |
| 2-Cyclohexylphenol | 44 | 1,200 | 10 | 100 | 41.8 | 84.5 |
| 2.4.5-trichlorophenol | 98.5 | 1,200 | 20 | 300 | 102.4 | 93.5 |
| 2-Chloro-4-phenylphenol | 51 | 900 | 10 | 150 | 54.3 | 95 |
| 2.4-dichloro-6-phenylphenol | 60 | 700 | 10 | 250 | 44 | 67.7 |
| 2.4.5.6.-tetrachlorophenol | 58 | 1,200 | 10 | 200 | 54.4 | 85.7 |

The method of preparing the anhydrous alkali metal phenoxides which I have disclosed is applicable to phenols as a class. I have found that the alkali metal phenoxides of the polyphenols, e. g. the dihydroxybenzenes, pyrogallol, the dihydroxydiphenyls, etc.; and the phenoxides of the substituted phenols can advantageously be prepared by the method hereinbefore outlined. Among the substituted phenols which I may employ are included (1) the aromatic substituted derivatives, e. g. 2-phenylphenol; (2) the aliphatic substituted derivatives, e. g. the cresols; (3) the alicyclic derivatives, e. g. 2-cyclohexylphenol; and (4) the halogenated compounds, e. g. the chlorocresols, the mono, di, tri, etc. chlorophenols, 2-chloro-4-phenylphenol, 2.4-dichloro-6-phenylphenol, etc.

I have determined that the organic solvents which may be advantageously used for dissolving the phenol are to be found in the group of hydrocarbons having a boiling point between about 75° and 180° C. Among the members of this group of compounds are benzene, naphtha, toluene, xylene, dihydrobenzene, 2.4 hexadiene, tetrahydrobenzene, cyclohexane, dihydrotoluene, tetrahydrotoluene, hexahydrotoluene and phenyl acetylene. Further, halogenated derivatives of the aforementioned hydrocarbons which have boiling points between about 75° and 180° C. and which under the conditions involved are unreactive with the phenol employed, may be used as solvents for the phenol. Among the members of this group I have found monochlorobenzene, dichlorobenzene, and chlorotoluene.

Among the organic solvents suitable for dissolving the alkali metal hydroxides are the aliphatic alcohols, e. g. methyl alcohol, ethyl alcohol, glycerine, etc.; and the aliphatic ethers, e. g. diethylether, dibutylether, etc. The boiling point of the solvent in which the alkali metal hydroxide is dissolved must be below the boiling point of the solvent selected for dissolving the phenol so that it can be substantially distilled off before the solvent for the phenol reaches its boiling point. The phenoxides are generally soluble in solvents suitable for dissolving the alkali metal hydroxide, and, if the solvent wherein the phenoxide is insoluble should distill off first, the phenoxide could not be separated except by evaporating the solution to dryness, which would yield an impure product due to hydrolysis.

The solvents selected in any particular instance will be in a measure determined by the phenol being treated. For instance, if the phenoxide of a tetrachlorophenol is being prepared, it is preferable to employ low boiling solvents such as benzene or toluene and methyl alcohol or diethyl ether. This avoids the heating of the tetrachlorophenol, or like compound having a reactive halogen attached thereto, to a high temperature in the presence of an alkali with which it might react.

The hereinbefore described method for the preparation of the alkali metal phenoxides may be modified in certain respects without departing from the spirit of the invention. For instance, the alkali metal hydroxide and the phenol may be reacted in an aliphatic alcohol or ether solution, followed by the addition of the toluene or equivalent agent, and the reaction mixture may be distilled to remove the alcohol or ether and water of reaction whereby the crystals of phenoxide will precipitate and may be separated from the mother liquor. A second method of procedure, of which one example is given, comprises adding a concentrated aqueous alkali metal hydroxide to a solution of a phenol in an organic solvent from the group described having a boiling point above 100° C.; and distilling the mixture to remove water, whereby substantially anhydrous phenoxide crystals are obtained. Still another procedure comprises dissolving a phenol in an organic solvent from the group described having therein present a quantity of an aliphatic alcohol or ether, adding an aqueous alkali metal hydroxide thereto and distilling the reaction mixture to obtain phenoxide crystals.

Certain advantages inhere to my novel method for the preparation of the substantially pure anhydrous alkali metal phenoxides. Among these advantages are (1) the production of compounds which, in general, have a purity above 99 per cent by weight; (2) the direct production of various anhydrous phenoxide salts which are difficult to prepare by drying their hydrated forms, and, (3) from a commercial viewpoint, the distinct advantage of using a comparatively inexpensive source of alkali metal rather than the pure metal.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of preparing a substantially anhydrous alkali metal phonoxide which comprises reacting a phenol dissolved in an inert organic solvent with an alkali metal hydroxide dissolved in a second organic solvent of lower boiling point then that of the first said solvent.

2. The method of preparing a substantially anhydrous alkali metal phenoxide which comprises reacting a phenol dissolved in an organic solvent from the group consisting of hydrocarbons having a boiling point between about 75° and 180° C., and the halogenated derivatives of the aforesaid hydrocarbons having boiling points between about 75° and 180° C., with an alkali metal hydroxide dissolved in a second organic solvent from the group consisting of the aliphatic alcohols and ethers.

3. The method of preparing substantially anhydrous alkali metal phenoxides which comprises reacting a phenol dissolved in an organic solvent from the group consisting of hydrocarbons having a boiling point between about 75° and 180° C., and the halogenated derivatives of the aforesaid hydrocarbons having boiling points between about 75° and 180° C., with an alkali metal hydroxide dissolved in a second organic solvent from the group consisting of the aliphatic alcohols and ethers of lower boiling point than the first said solvent, evaporating off the second said solvent and the water formed by reaction between the phenol and the alkali metal hydroxide, and separating the alkali metal phenoxide crystals from the mother liquor.

4. The method of preparing substantially anhydrous alkali metal phenoxides which comprises reacting a phenol dissolved in a hydrocarbon solvent having a boiling point between about 75° and 180° C., with an alkali metal hydroxide dissolved in an aliphatic alcohol of lower boiling point than the said hydrocarbon solvent.

5. The method of preparing substantially anhydrous alkali metal phenoxides which comprises reacting a phenol dissolved in a hydrocarbon solvent having a boiling point between about 75° and 180° C., with an alkali metal hydroxide dissolved in an aliphatic alcohol of lower boiling point than the said hydrocarbon solvent, evaporating off the aliphatic alcohol and water formed during the reaction, and separating the phenoxide crystals from the mother liquor.

6. The method of preparing substantially anhydrous sodium phenoxide which comprises reacting $C_6H_5OH$ dissolved in toluene with sodium hydroxide dissolved in methyl alcohol, evaporating off the alcohol and water formed during the reaction, and separating the phenoxide crystals from the toluene.

7. The method of preparing substantially anhydrous sodium orthophenylphenoxide which comprises reacting $C_6H_5(OH).C_6H_5$ dissolved in toluene with sodium hydroxide dissolved in methyl alcohol, evaporating off the alcohol and water formed during the reaction, and separating the phenoxide crystals from the toluene.

8. The method of preparing substantially anhydrous sodium chlorophenylphenoxide which comprises reacting $C_6H_5(OH).C_6H_5.Cl$ dissolved in toluene with sodium hydroxide dissolved in methyl alcohol, evaporating off the alcohol and water formed during the reaction, and separating the phenoxide crystals from the toluene.

9. In a method of preparing a substantially anhydrous alkali metal phenoxide by mixing a solution of a phenol with a solution of an alkali metal hydroxide, the step which consists in dissolving the hydroxide in an inert organic solvent having a lower boiling point than that employed for the phenol.

LINDLEY E. MILLS.